(12) United States Patent
Xi et al.

(10) Patent No.: US 10,296,120 B2
(45) Date of Patent: May 21, 2019

(54) TOUCH DISPLAY PANEL AND DRIVING METHOD

(71) Applicant: AU Optronics Corporation, Hsin-Chu (TW)

(72) Inventors: Peng-Bo Xi, Hsin-Chu (TW); Sung-Yu Su, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 30 days.

(21) Appl. No.: 15/678,623

(22) Filed: Aug. 16, 2017

(65) Prior Publication Data
US 2018/0081472 A1    Mar. 22, 2018

(30) Foreign Application Priority Data

Sep. 22, 2016    (TW) .............................. 105130525 A

(51) Int. Cl.
| | | |
|---|---|---|
| *G06F 3/041* | (2006.01) | |
| *G06F 3/044* | (2006.01) | |
| *G02F 1/13* | (2006.01) | |
| *G09G 3/36* | (2006.01) | |
| *G02F 1/1343* | (2006.01) | |

(52) U.S. Cl.
CPC .......... *G06F 3/0412* (2013.01); *G02F 1/1323* (2013.01); *G06F 3/044* (2013.01); *G02F 2001/134381* (2013.01); *G09G 3/3607* (2013.01); *G09G 3/3614* (2013.01); *G09G 2300/0447* (2013.01); *G09G 2310/027* (2013.01); *G09G 2320/068* (2013.01)

(58) Field of Classification Search
CPC ... G06F 3/044; G02F 1/1323; G02F 1/134363
See application file for complete search history.

(56) References Cited

U.S. PATENT DOCUMENTS 8,289,490 B2 * 10/2012 Jang ...................... G02F 1/1323
                                                         345/95
8,988,643 B2    3/2015 Yang et al.
(Continued)

FOREIGN PATENT DOCUMENTS

CN             106773176 A        5/2017

OTHER PUBLICATIONS

European Patent Office "Office Action" dated Feb. 2, 2018, EPO.

*Primary Examiner* — Yuzhen Shen
(74) *Attorney, Agent, or Firm* — WPAT, PC

(57) ABSTRACT

A touch display panel and a driving method thereof are disclosed. The touch display panel includes a plurality of pixels, a plurality of viewing angle control (VAC) electrode units, and a plurality of touch receiving electrode units. Each pixel includes a pixel electrode and a common electrode. At least one of the pixel electrode and the common electrode has a plurality of slits. The VAC electrode units are arranged along a first direction. Each VAC electrode unit includes a plurality of first VAC electrode series and a plurality of second VAC electrode series, and each first VAC electrode series and each second VAC electrode series are alternately arranged along the first direction. The touch receiving electrode units are arranged along the second direction, and the VAC electrode units and the touch receiving electrode unit form a touch unit.

12 Claims, 11 Drawing Sheets

(56) References Cited

U.S. PATENT DOCUMENTS

| | | | |
|---|---|---|---|
| 2007/0046881 A1* | 3/2007 | Takei | G02F 1/1323 |
| | | | 349/139 |
| 2010/0182273 A1 | 7/2010 | Noguchi et al. | |
| 2014/0028616 A1* | 1/2014 | Furutani | G06F 3/044 |
| | | | 345/174 |
| 2015/0355757 A1* | 12/2015 | Hoch | G06F 3/044 |
| | | | 345/174 |
| 2017/0003807 A1* | 1/2017 | Abe | G06F 3/0416 |

* cited by examiner

TOUCH DISPLAY PANEL AND DRIVING METHOD

CROSS-REFERENCE TO RELATED APPLICATION

This application claims the priority benefit of Taiwan application serial no. 105130525, filed on Sep. 22, 2016. The entirety of the above-mentioned patent application is hereby incorporated by reference herein and made a part of the specification.

BACKGROUND

Technical Field

The present invention relates to a touch display panel and a driving method therefore, and in particular, to a touch display panel with a peep-proof function and a driving method therefore.

Related Art

With the rapid development of science and technology, a wide viewing angle display technology has been widely applied to liquid crystal display panels, for example, an in-plane switching (in-plane switching, IPS) liquid crystal display panel, a fringe field switching (fringe field switching, FFS) liquid crystal display panel, or a multi-domain vertical alignment (multi-domain vertical alignment, MVA) liquid crystal display panel. Because the wide viewing angle display technology aims to reach an angle of watching a display panel as much as possible, others rather than a user cannot be prevented from watching. In this way, a wide viewing angle display panel cannot meet the peep-proof requirement, that is, the wide viewing angle display panel cannot display an image within a limited viewing angle range. Although general liquid crystal display panels can meet the peep-proof requirement due to lack of a wide viewing angle function, they cannot meet the wide viewing angle requirement at the same time. Therefore, liquid crystal display panels capable of switching between a narrow viewing angle and a wide viewing angle have been developed currently to meet the peep-proof and wide viewing angle requirements at the same time.

It is known that in a liquid crystal display panel having a peep-proof function, a viewing angle control electrode is provided between an upper substrate and a liquid crystal layer of a liquid crystal display panel having a wide viewing angle function, and a voltage with a same polarity as that of a pixel voltage is provided in a narrow viewing angle mode, so that liquid crystal molecules adjacent to the upper substrate may present vertical alignment, so as to achieve the narrow viewing angle function. However, to reduce a load of a driving chip, only one or two viewing angle control electrodes are configured, that is, a quantity thereof is far less than that of pixel lines. In this way, voltages of the viewing angle control electrodes cannot be one-to-one corresponding to driving of the pixel lines, in particular, when pixels are driven in a manner of polarity inversion, voltages provided to the viewing angle control electrodes further have an obvious time difference with display time of the pixel lines, and consequently, the peep-proof function of images displayed by most of the pixel lines is not obvious.

SUMMARY

A main objective of the present invention lies in providing a touch display panel and a driving method therefore, so as to achieve touch sensing and peep-proof functions at the same time.

A first embodiment of the present invention provides a touch display panel, comprising a first substrate, a second substrate, a medium display layer, a plurality of pixels, a plurality of viewing angle control electrode units, a third substrate, and a plurality of touch receiving electrode units. The first substrate and the second substrate are provided opposite to each other. The medium display layer is provided between the first substrate and the second substrate. The pixels are provided between the first substrate and the medium display layer, and each of the pixels comprises a pixel electrode and a common electrode, wherein at least one of the pixel electrode and the common electrode has a plurality of slits. The viewing angle control electrode units are provided between the second substrate and the medium display layer, wherein the viewing angle control electrode units are arranged along a first direction in sequence; each of the viewing angle control electrode units comprises a plurality of first viewing angle control electrode series and a plurality of second viewing angle control electrodes series; and each of the first viewing angle control electrode series and each of the second viewing angle control electrode series are alternately arranged along the first direction. The third substrate is provided opposite to the second substrate, wherein the second substrate is provided between the first substrate and the third substrate. The touch receiving electrode units are provided between the second substrate and the third substrate, are arranged along a second direction in sequence, and are partially overlapping with the viewing angle control electrode units in a direction vertically projected on the first substrate, wherein the viewing angle control electrode units and the touch receiving electrode units form a touch unit.

Another embodiment of the present invention provides a method for driving a touch display panel. First, the touch display panel is provided, wherein the touch display panel comprises a plurality of pixels, a plurality of viewing angle control electrode units, and a plurality of touch receiving electrode units. Each of the pixels comprises a pixel electrode and a common electrode, and at least one of the pixel electrode and the common electrode has a plurality of slits. The viewing angle control electrode units are arranged along a first direction in sequence, wherein each of the viewing angle control electrode units comprises a plurality of first viewing angle control electrode series and a plurality of second viewing angle control electrodes series, and each of the first viewing angle control electrode series and each of the second viewing angle control electrode series are alternately arranged along the first direction. The touch receiving electrode units are arranged along a second direction in sequence, and are partially overlapping with the viewing angle control electrode units in a vertically projected direction, wherein the viewing angle control electrode units and the touch receiving electrode units form a touch unit. Then, in an Nth timing of a first image, a touch signal is provided to the first viewing angle control electrode series and the second viewing angle control electrode series of the Nth viewing angle control electrode unit, wherein N is a positive integer. Next, in an (N+1)th timing of the first image, providing the touch signal is stopped, and a first viewing angle control voltage is provided to the first viewing angle control electrode series of the Nth viewing angle control electrode unit, and a second viewing angle control voltage is provided to the second viewing angle control electrode series of the Nth viewing angle control electrode unit.

DETAILED DESCRIPTION

In order to enable persons of ordinary skill in the art to further understand the present invention, the features of the present invention and the effects to be achieved are described in detail below through preferred embodiments of the present invention and with reference to the accompanying drawings.

Figure 1:
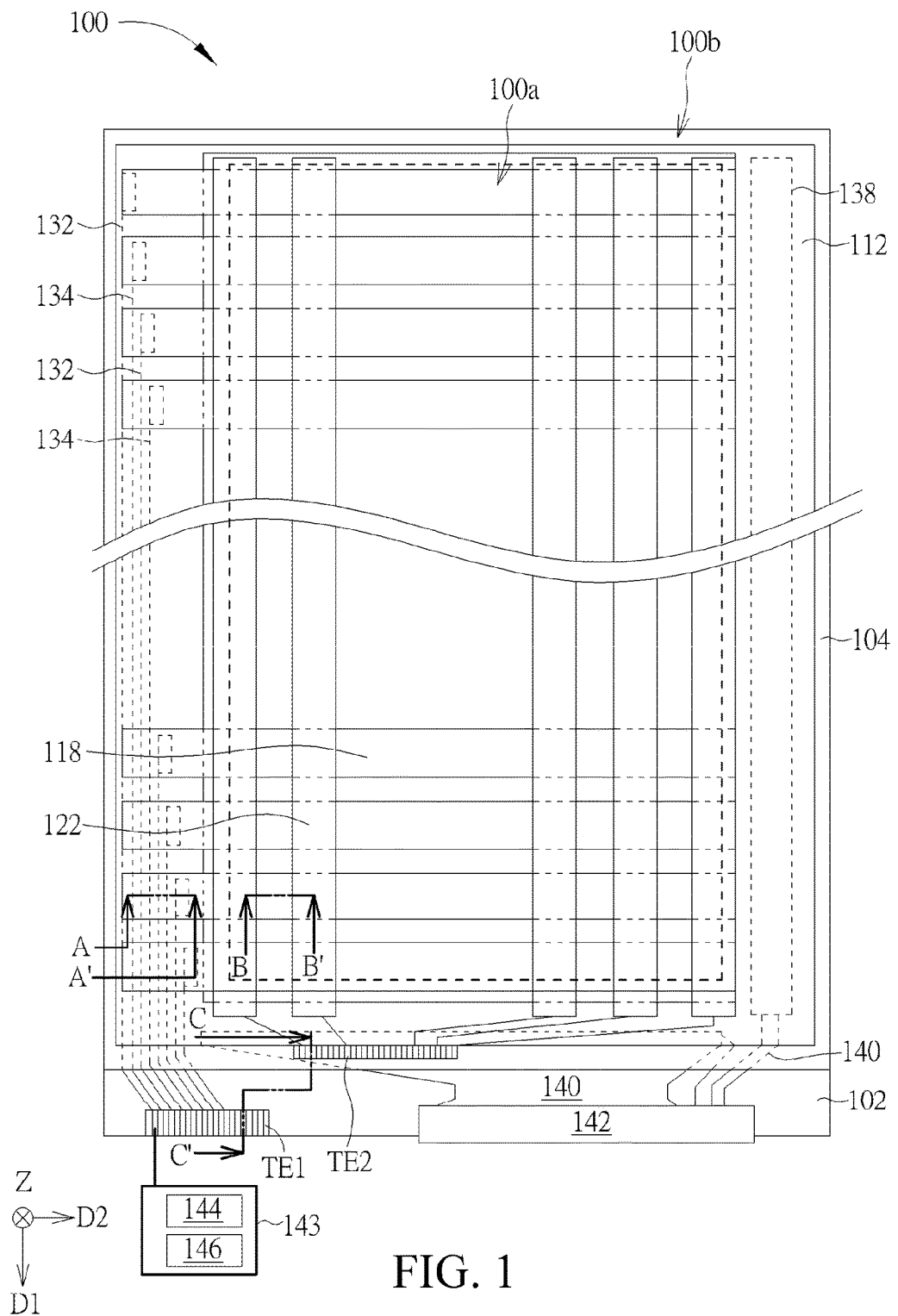
FIG. 1 is a schematic top view of a touch display panel of a first embodiment of the present invention.
Figure 2:
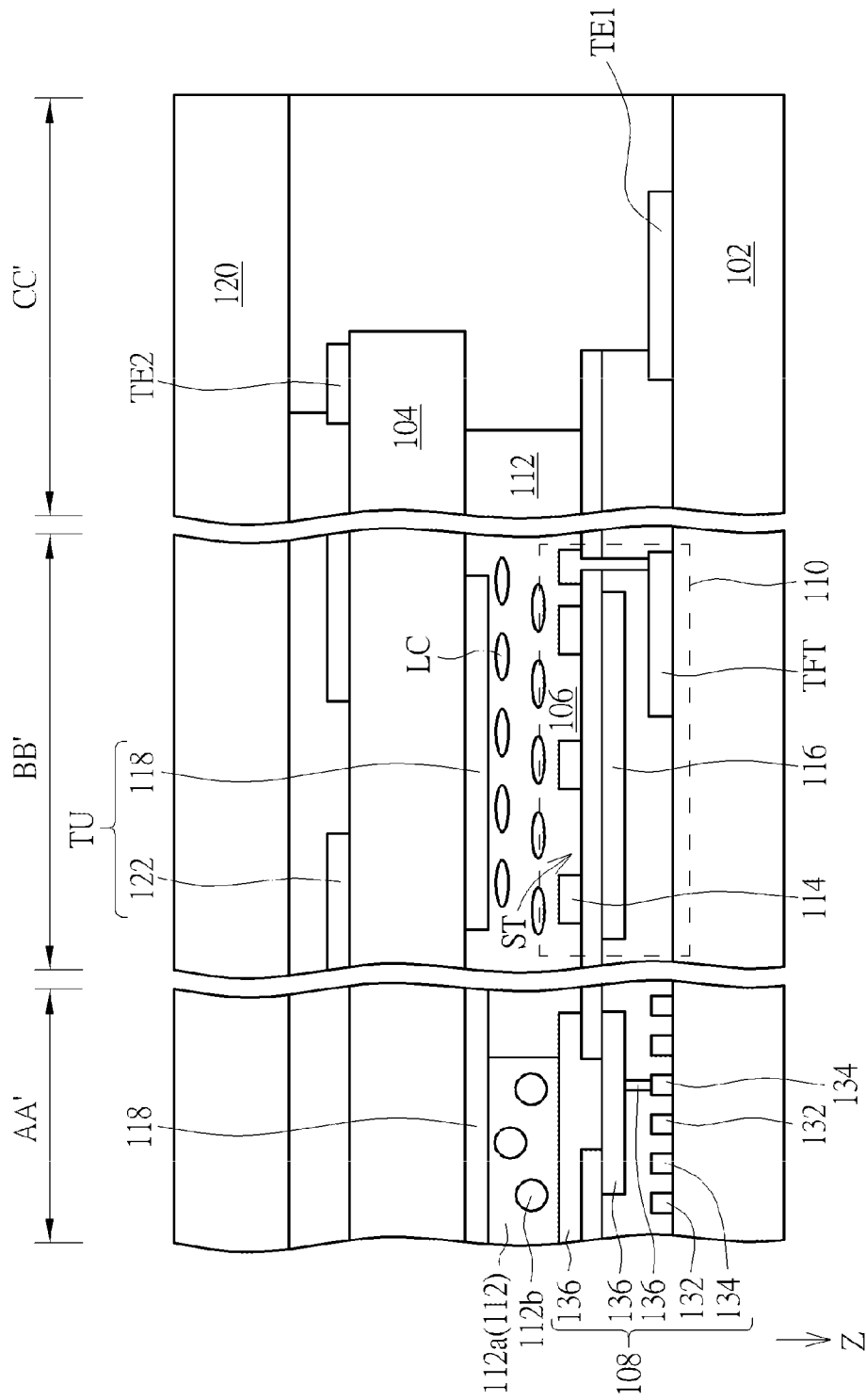
FIG. 2 is a schematic sectional view along a section line A-A', a section line B-B', and a section line C-C' of FIG. 1.

Referring to FIG. 1 and FIG. 2, FIG. 1 is a schematic top view of a touch display panel of a first embodiment of the present invention, and FIG. 2 is a schematic sectional view along a section line A-A', a section line B-B', and a section line C-C' of FIG. 1. As shown in FIG. 1 and FIG. 2, a touch display panel 100 of this embodiment may include a display area 100a and a peripheral area 100b, where the touch display panel 100 displays an image in the display area 100a, and the peripheral area 100b is provided around the display area 100a, and may be used to set peripheral routes. The touch display panel 100 may include a first substrate 102, a second substrate 104, a medium display layer 106, and an array circuit layer 108. The first substrate 102 and the second substrate 104 are provided opposite to each other, and the medium display layer 106 is provided between the first substrate 102 and the second substrate 104 in the display area 100a. The array circuit layer 108 is formed on the first substrate 102 between the first substrate 102 and the medium display layer 106; conductive materials used by the array circuit layer 108 include metal, thin film metal, and transparent conductive thin film materials (ITO, IZO, IGZO . . . ); a corresponding conductive material, for example, a metal electrode, a transparent electrode, or a metal contact pad, is selected according to an objective, a process, and a set location for displaying an image. The array circuit layer 108 may include a plurality of pixels 110, provided between the first substrate 102 and the medium display layer 106 in the display area 100a, where the pixels 100 may be used to display each single-colored subpixel or each pixel in an image. The first substrate 102 may include a transparent substrate, for example, a glass substrate, a plastic substrate, an acrylic substrate, a quartz substrate, a sapphire substrate, or another suitable hard substrate or flexible substrate, for providing the array circuit layer 108. The second substrate 104, for example, may be a color filter substrate, and persons skilled in the art should know that the second substrate 104 may include elements (not shown) necessary for a display function, for example, an alignment layer, a color filter, and a black matrix, and details are not described herein again. The medium display layer 106 may include a liquid crystal layer that includes a plurality of liquid crystal modules LC. In another embodiment, the medium display layer 106 may also include an organic light emitting layer, an inorganic light emitting layer, an electrophoretic display material layer, an electrowetting display material layer, an electric dust display material layer, a field emission display material layer, or a plasma display material layer. In addition, the touch display panel 100 may further include a sealant 112, provided between the first substrate 102 and the second substrate 104 in the peripheral area 100b for engaging the substrate 102 with the second substrate 104.

In this embodiment, the pixels 100 may be arranged on the first substrate 102 in an array manner. In another embodiment, an arrangement manner of the pixels 110 may be adjusted according to actual design requirements, for example: the pixels 110 for generating three primary colors may be arranged in a shape of a triangle, but the present invention is not limited thereto. In addition, each of the pixels 110 may include a pixel electrode 114 and a common electrode 116, which are, for example, transparent electrodes electrically insulated from each other; the pixel electrode 114 is electrically connected to a thin film transistor TFT, and at least one of the pixel electrode 114 and the common electrode 116 has a plurality of slits S. In the present invention, the pixel electrode 114 may be provided between the common electrode 116 and the medium display layer 106, and the pixel electrode 114 may include the slits S; in this way, when there is a voltage difference between the pixel electrode 114 and the common electrode 116, a horizontal electric field is generated between the pixel electrodes 114 and the common electrodes 116 of an entire surface, and is applied to the medium display layer 106, so that the touch display panel 100 may generate an image having a wide viewing angle. In another embodiment, the common electrode 116 and the pixel electrode 114 may both have the slits S, so that a branch of the common electrode 116 and a branch of the pixel electrode 114 are alternately arranged. In addition, in a case in which the common electrode 116 and the pixel electrode 114 both have the slits S, the common electrode 116 and the pixel electrode 114 may be selectively provided on a same plane. Or in other embodiments, the common electrode 116 may have the slits S, and is provided between the pixel electrode 114 and the medium display layer 106.

In this embodiment, the touch display panel 100 further includes a first terminal electrode TE1, provided on the first substrate 102, and a second terminal electrode TE2, provided on the second substrate 104, and the first terminal electrode TE1 and the second terminal electrode TE2 are used to be respectively electrically connected to an external circuit. The first terminal electrode TE1 and the second terminal electrode TE2 in this embodiment of the present invention have single-layered structures, but the present invention is not limited thereto. For example, the first terminal electrode TE1 may have a multi-layered structure, and is formed by means of covering an insulation layer on a metal electrode, and then connecting a transparent electrode above the insulation layer to a contact hole.

In this embodiment, the touch display panel 100 may further include a plurality of viewing angle control electrode units 118, a third substrate 120, and a plurality of touch receiving electrode units 122. The viewing angle control electrode units 118 are provided between the second substrate 104 and the medium display layer 106, and are arranged along a first direction D1 in sequence. The third substrate 120 is provided opposite to the second substrate 104, where the second substrate 104 is provided between the first substrate 102 and the third substrate 120. The third substrate 120 may be used as a cover plate on an outermost side of the touch display panel 100 for protecting elements of the touch display panel 100, for example, the third substrate 120 may include a transparent substrate, for example, a glass substrate, a plastic substrate, an acrylic substrate, a quartz substrate, a sapphire substrate, or another suitable hard substrate or flexible substrate. The touch receiving electrode units 122 are provided between the second substrate 104 and the third substrate 120, are arranged along a second direction D2 in sequence, and are partially overlapping with the viewing angle control electrode units 118 in a direction Z vertically projected on the first substrate 102, where the viewing angle control electrode units 118 and the touch receiving electrode units 122 are electrically insulated by means of the second substrate 104 and form a touch unit TU. By means of sequential transmission of touch signals on the viewing angle control electrode units 118, the touch receiving electrode units 122 may generate sensing signals according to the touch signals; in addition, when a touch object approaches to an intersection between a specific touch receiving electrode unit 122 and a specific viewing angle control electrode unit 118, a sensing signal generated by the touch receiving electrode unit 122 is affected by the touch object and changes; in this way, the objective of touch sensing can be achieved.

Figure 3:
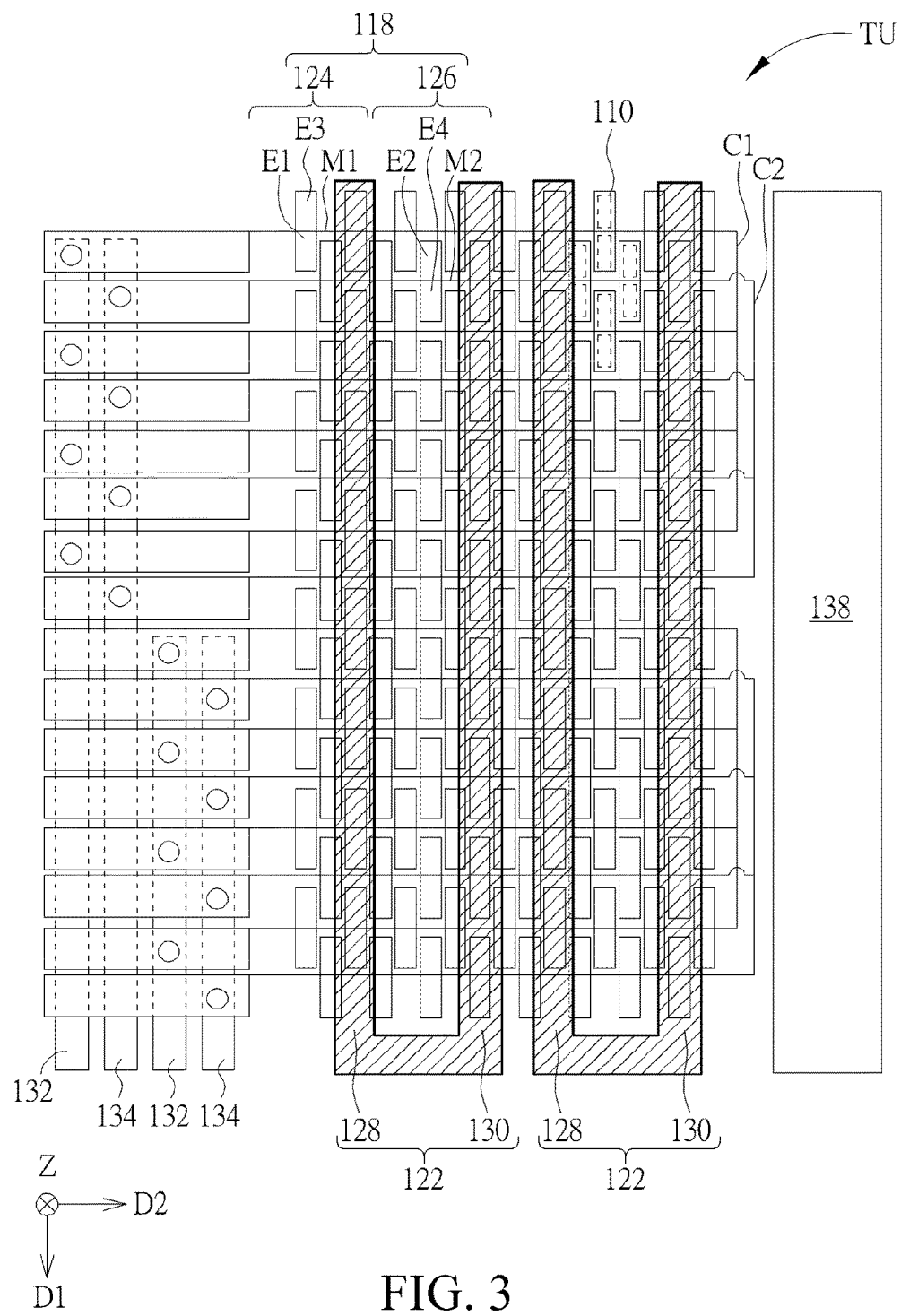
FIG. 3 is a schematic top view of a touch unit and a first gate driving circuit of the first embodiment of the present invention.

Referring to FIG. 3 for details, FIG. 3 is a schematic top view of a touch unit and a first gate driving circuit of the first embodiment of the present invention. As shown in FIG. 3, each of the viewing angle control electrode units 118 may include a plurality of first viewing angle control electrode series 124 and a plurality of second viewing angle control electrode series 126, and each of the first viewing angle control electrode series 124 and each of the second viewing angle control electrode series 126 are alternately arranged along the first direction D1. In this embodiment, each of the first viewing angle control electrode series 124 includes a plurality of first electrode parts E1, and each of the second viewing angle control electrode series 126 includes a plurality of second electrode parts E2, where each of the first electrode parts E1 and each of the second electrode parts E2 are alternately arranged along the second direction D2. Specifically, each of the first viewing angle control electrode series 124 may include a first stem part M1, and each of the first electrode parts E1 respectively extends from one side of the first stem part M1; each of the second viewing angle control electrode series 126 may include a second stem part M2, and each of the second electrode parts E2 respectively extends from one side, facing the first stem part M1, of the second stem part M2. In this embodiment, the first viewing angle control electrode series 124 may further include a plurality of third electrode parts E3, which respectively extend from the other side of the first steam part M1, so that the first electrode parts E1 and the third electrode parts E3 are respectively located on two sides of the first stem part M1; and each of the third electrode parts E3 and the first electrode part E1 corresponding thereto are arranged on the first direction D1, and therefore, the first viewing angle control electrode series 124 may have a grid-shaped structure. The second viewing angle control electrode series 126 may further include a plurality of fourth electrode parts E4, which respectively extend from the other side of the second steam part M2, so that the second electrode parts E2 and the fourth electrode parts E4 are respectively located on two sides of the second stem part M2; and each of the fourth electrode parts E4 and the second electrode part E2 corresponding thereto are arranged on the first direction D1, and therefore, the second viewing angle control electrode series 126 may have a grid-shaped structure. In addition, each of the third electrode parts E3 and each of the fourth electrode parts E4 are also alternately arranged along the second direction D2. When the pixels 110 of the touch display panel 100 perform image display in a narrow viewing angle mode in a driving manner of polarity inversion, viewing angle control voltages with reverse polarities are respectively applied to the first viewing angle control electrode series 124 and the second viewing angle control electrode series 126. Because each of the first electrode parts E1, each of the second electrode parts E2, each of the third electrode parts E3, and each of the fourth electrode parts E4 are respectively set corresponding to a pixel 110, and preferably covers the corresponding pixel 110, designing the first viewing angle control electrode series 124 and the second viewing angle control electrode series 126 as grid-shaped structures, and designing each of the first electrode parts E1 and each of the second electrode parts E2 as alternately arranged along the second direction D2 may facilitate providing viewing angle control voltages with suitable polarities in cooperation with polarities of the pixels 110 when the pixels 110 are driven in a manner of column inversion, so that the liquid crystal modules LC that are close to the second substrate 104 are controlled by the viewing angle control voltages and present approximately-vertical alignment, thereby achieving the effect of a narrow viewing angle. In addition, in each of the viewing angle control electrode units 118, the first viewing angle control electrode series 124 are electrically connected to each other, and the second viewing angle control electrode series 126 are electrically connected to each other. For example, each of the viewing angle control electrode units 118 may selectively include a first connection part C1 and a second connection portion C2. The first connection portion C1 is provided on one end of the first viewing angle control electrode series 124 and is connected to the first viewing angle control electrode series 124 of a same viewing angle control electrode unit 118. The second connection portion C2 is provided on one end of the second viewing angle control electrode series 126 and is connected to the second viewing angle control electrode series 126 of a same viewing angle control electrode unit 118. For example, a width of each of the viewing angle control electrode units 118 in the first direction D1 may be less than a width of the touch object, for example, 6 to 7 μm or about 5 μm.

Each of the touch receiving electrode units 122 includes a first touch electrode series 128 and a second touch electrode series 130; the first touch electrode series 128 and the second touch electrode series 130 are provided in parallel along the second direction D2 and are electrically connected to each other. In this embodiment, each of the first touch electrode series 128 and each of the second touch electrode series 130 may respectively cover the first electrode parts E1 and the third electrode parts E3 arranged in a same column or the second electrode parts E2 and the fourth electrode parts E4 arranged in a same column. It should be noted that because each of the first electrode parts E1, each of the second electrode parts E2, each of the third electrode parts E3, and each of the fourth electrode parts E4 may be respectively provided corresponding to the pixels 110, the touch receiving electrode unit 122 may not be affected by driving of the pixels 110 due to shield of the viewing angle control electrode unit 118 when generating a sensing signal, so as to accurately detect a location of the touch object.

The touch display panel 100 may further include a plurality of first connection lines 132 and a plurality of second connection lines 134, provided between the first substrate 102 and the medium display layer 106 in the peripheral area 100b. Each of the first connection lines 132 is respectively electrically connected to the first viewing angle control electrode series 124 of the viewing angle control electrode unit 118 corresponding thereto, and the first viewing angle control electrode series 124 of a single viewing angle control electrode unit 118 may also be electrically connected to each other by means of the first connection line 132. Each of the second connection lines 134 is respectively electrically connected to the second viewing angle control electrode series 126 of the viewing angle control electrode unit 118 corresponding thereto, and the second viewing angle control electrode series 126 of a single viewing angle control electrode unit 118 may also be electrically connected to each other by means of the second connection line 134.

Refer to FIG. 1 and FIG. 2 together. Specifically, a part of the sealant 112 corresponding to the first connection line 132 may include a conductive adhesive layer 112a, provided between the first substrate 102 and the second substrate 104, where the conductive adhesive layer 112a may be, for example, an anisotropic conductive adhesive, including conductive particles 112b, and therefore each of the first connection lines 132 provided on the first substrate 102 may be electrically connected to the first viewing angle control electrode series 124 of the first viewing angle control electrode unit 118 corresponding thereto provided on the second substrate 102 by means of the conductive adhesive layer 112a, and each of the second connection lines 134 provided on the first substrate 102 may be electrically connected to the second viewing angle control electrode series 126 of the first viewing angle control electrode unit 118 corresponding thereto provided on the second substrate 104 by means of the conductive adhesive layer 112a. In addition, the first connection lines 132 and the second connection lines 134 may be formed by any conductive pattern layer in the array circuit layer 108. For example, the first connection lines 132, the second connection lines 134, a gate of a thin film transistor TFT, and a scan line (not shown) may be formed by a metal layer, and the array circuit layer 108 may further include a contact pad 136, provided between each of the first connection lines 132 and each of the second connection lines 134 and the conductive adhesive layer 112a, so as to respectively electrically connect each of the first connection lines 132 and each of the second connection lines 134 to the conductive particles 112b. The contact pad 136 may be formed by one or more conductive layers. In this embodiment, the first connection lines 132 and the second connection lines 134 are provided on one side, in the direction Z vertically projected on the first substrate 102, of the viewing angle control electrode units 118. In should be noted that because the first connection lines 132 and the second connection lines 134 may be formed by any conductive pattern layer in the array circuit layer 108, to prevent the first connection lines 132 and the second connection lines 134 from affecting wiring configuration in the array circuit layer 108, a first gate driving circuit 138, electrically connected to the pixels 110, in the array circuit layer 108 is provided one the other side of the connection lines (that is, the first connection lines 132 and the second connection lines 134) relative to the display area 100a, that is, the display area 100a is provided between the first gate driving circuit 138 and the connection lines. In this way, a width of a frame of the touch display panel 100 may also be prevented from being excessively increased. In addition, the first gate driving circuit 138 and the pixels 110 may be electrically connected to a display control element 142 provided on the first substrate 102 by means of a bus line 140, so as to control timing of image display of the pixels 110 by means of the display control element 142.

The touch display panel 100 may further include a driving circuit 143, which may include a first driving unit 144 and a second driving unit 146. The first driving unit 144 is configured to provide a viewing angle control voltage signal, and the second driving unit 146 is configured to provide a touch signal. The viewing angle control electrode unit 118 may be electrically connected to the driving circuit 143 by means of the first terminal electrode TE1, so that the viewing angle control electrode unit 118 respectively receives the viewing angle control voltage signal and the touch signal at different time, thereby respectively executing functions of viewing angle control and touch sensing.

Figure 4:
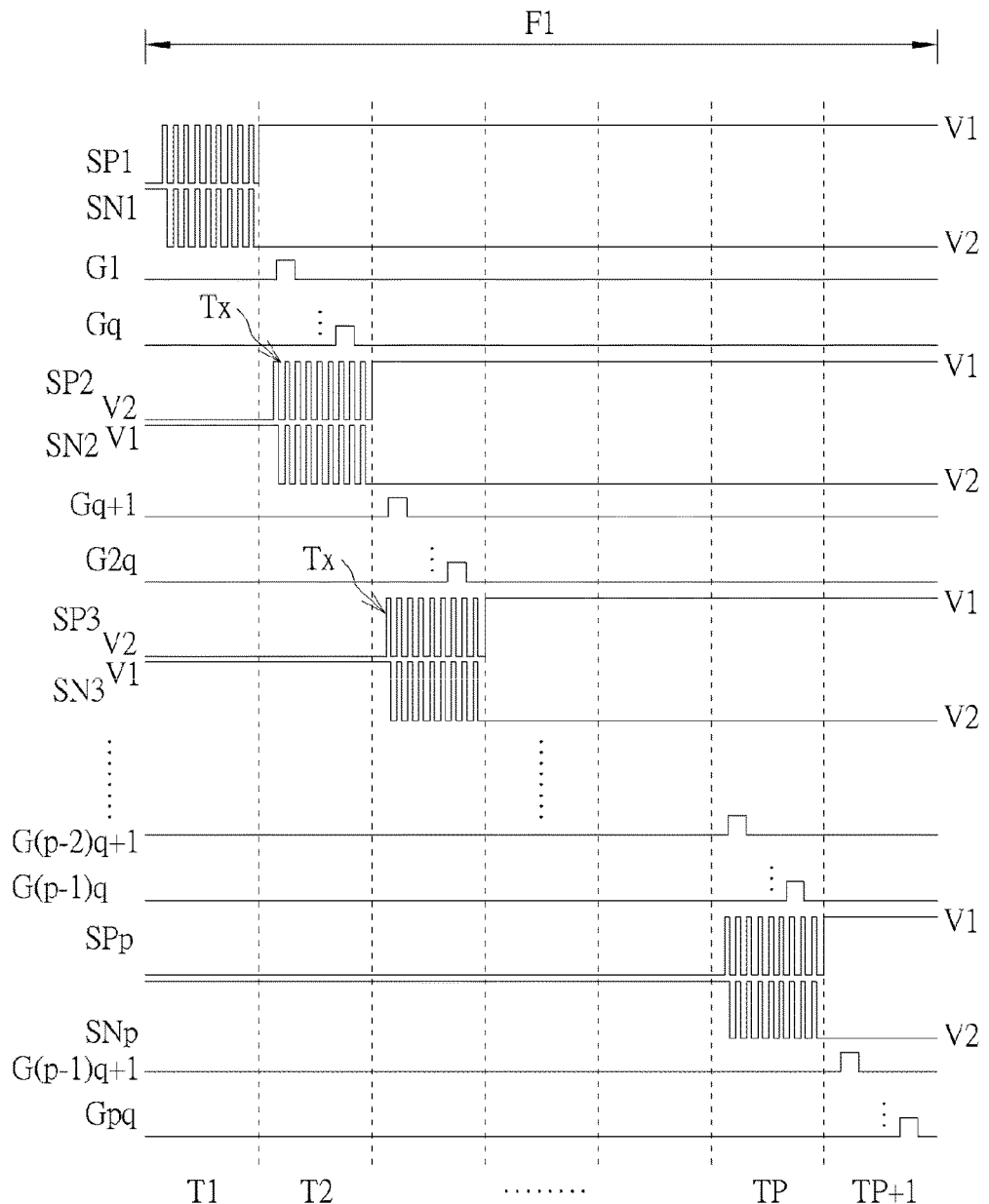
FIG. 4 is a schematic diagram of a method for driving the touch display panel of the first embodiment of the present invention in a first display mode.
Figure 5:
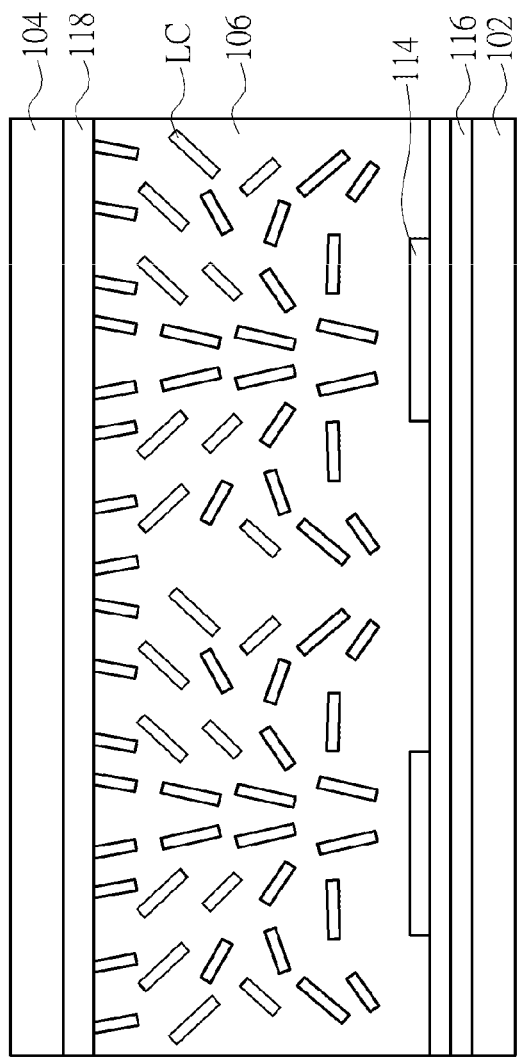
FIG. 5 is a schematic sectional view of liquid crystal modules of the touch display panel of the first embodiment of the present invention in the first display mode.

According to the foregoing touch display panel 100, the present invention provides a method for driving the touch display panel 100. Referring to FIG. 4, FIG. 5, and FIG. 3, FIG. 4 is a schematic diagram of a method for driving the touch display panel of the first embodiment of the present invention in a first display mode, and FIG. 5 is a schematic sectional view of the liquid crystal modules of the touch display panel of the first embodiment of the present invention in the first display mode. As shown in FIG. 3 to FIG. 5, the method for driving the touch display panel 100 of this embodiment in the first display mode includes the following steps, wherein the first display mode is a narrow viewing angle mode. First, the foregoing touch display panel 100 is provided. Then, in an Nth timing of a first image F1, the second driving unit 146 provides a touch signal TX to the first viewing angle control electrode series 124 and the second viewing angle control electrode series 126 of an Nth viewing angle control electrode unit 118, where N is a positive integer. Subsequently, in an (N+1)th timing of the first image F1, the second driving unit 146 stops providing the touch signal TX to the Nth viewing angle control electrode unit 118, and provides a first viewing angle control voltage V1 to the first viewing angle control electrode series 124 of the Nth viewing angle control electrode unit 118, and provides a second viewing angle control voltage V2 to the second viewing angle control electrode series 126 of the Nth viewing angle control electrode unit 118. At the same time, in the (N+1)th timing, the first gate driving circuit 138 provides a plurality of gate signals in sequence respectively to the pixels 110 of the Nth viewing angle control electrode unit 118.

In this embodiment, the first viewing angle control electrode series 124 of first to pth viewing angle control electrode units 118 may respectively receive signals SP1 to SPp in sequence, and the second viewing angle control electrode series 126 of the first to pth viewing angle control electrode units 118 may respectively receive signals SN1 to SNp in sequence, where p is a quantity of the viewing angle control electrode units 118. In addition, a direction in which the signals are transmitted in sequence to the viewing angle control electrode units 118 is the same as a direction in which the gate signals are provided to pixel lines. Specifically, when N is 1, that is, in a first timing T1, the second driving unit 146 first transmits the touch signal TX to the first viewing angle control electrode unit 118, and the touch receiving electrode unit 122 may generate a sensing signal corresponding to the touch signal TX, and at the moment, the gate signals have not been transmitted yet. At the same time, the first viewing angle control electrode series 124 and the second viewing angle control electrode series 126 of the remaining viewing angle control electrode units 118 respectively provide the second viewing angle control voltage V2 and the first viewing angle control voltage V1, that is, provide the viewing angle control voltages to the first viewing angle control electrode series 124 and the second viewing angle control electrode series 126 in a previous image. Then, in a second timing T2, the second driving unit 146 stops transmitting the touch signal TX to the first viewing angle control electrode unit 118, and the first driving unit 144 transmits the first viewing angle control voltage V1 to the first viewing angle control electrode series 124 of the first viewing angle control electrode unit 118, and transmits the second viewing angle control voltage V2 to the second viewing angle control electrode series 126 of the first viewing angle control electrode unit 118. The first viewing angle control voltage V1 is the same as a pixel voltage provided to the pixel electrode 114 when each of the pixels 110 has positive polarity and displays a maximum gray-scale value, and the second viewing angle control voltage V2 is the same as a pixel voltage provided to the pixel electrode 114 when each of the pixels 110 has negative polarity and displays a maximum gray-scale value. At the same time, the first gate driving circuit 138 transmits gate signals G1 to Gq in sequence to the pixels 110 of the corresponding first viewing angle control electrode unit 118, and transmits the touch signal TX to the second viewing angle control electrode unit 118. The corresponding pixels 110 can be opened in sequence by means of the gate signals G1 to Gq, and pixel voltages are input into the corresponding pixels 110; images can be displayed by means of the corresponding pixels 110, where q is a quantity of pixel lines driven in a single timing. By such analogy, when N is p, in a pth timing Tp, the touch signal TX is transmitted to a pth viewing angle control electrode unit 118, and the touch receiving electrode unit 122 may generate a sensing signal corresponding to the touch signal TX. At the same time, gate signals G(p−2)q+1 to G(p−1)q are transmitted in sequence to the pixels 110 of a (p−1)th viewing angle control electrode unit 118. Then, in a (p+1)th timing Tp+1, the first gate driving circuit 138 stops transmitting the touch signal TX to the pth viewing angle control electrode unit 118, and respectively transmits the first viewing angle control voltage V1 and the second viewing angle control voltage V2 to the first viewing angle control electrode series 124 and the second viewing angle control electrode series 126 of the pth viewing angle control electrode unit 118. In addition, the first gate driving circuit 138 transmits gate signals G(p−1)q+1 to Gpq in sequence to the pixels 110 of the pth viewing angle control electrode unit 118, and thus display of the first image F1 is completed, and at the same time, a function of touch sensing is performed. It should be noted that in a same timing, the viewing angle control electrode units 118 for transmitting the touch signal TX do not correspond to the pixels 110 to which gate signals are transmitted, that is, the viewing angle control electrode units 118 are not overlapping with the pixels 110 in the direction Z vertically projected on the first substrate 102, and therefore display of the pixels 110 is not easily affected by the touch signal TX. Further, because time when gate signals are provided may be overlapping with time when the touch signal TX is transmitted, an amplitude, of compression due to touch sensing, of the time when the gate signals are provided may be effectively reduced, thereby effectively avoiding a load of the display control element 142. In addition, the touch unit TU of this embodiment performs touch sensing in a mutual-capacitive touch sensing manner, and therefore compared with self-capacitive touch sensing, a quantity of transmitted signals may be further reduced, thereby reducing a load of the second driving unit 146. In another embodiment, the touch signal TX and the first viewing angle control voltage V1 may be integrated into a first integrated signal, and the touch signal TX and the second viewing angle control voltage V2 may be integrated into a second integrated signal. In this way, the first integrated signal and the second integrated signal may be provided by means of a single driving circuit only, thereby reducing elements that drive the viewing angle control electrode units 118, and reducing a load of the touch display panel 100.

It should be noted that, a pixel voltage provided to the pixels 110 of the corresponding first viewing angle control electrode series 124 has a same polarity of the first viewing angle control voltage V1, and similarly, a pixel voltage provided to the pixels 110 of the corresponding second viewing angle control electrode series 126 has a same polarity of the second viewing angle control voltage V2. In this way, the first viewing angle control voltage V1 of the first viewing angle control electrode series 124 and the second viewing angle control voltage V2 of the second viewing angle control electrode series 126 may form a vertical electric field with the common electrode 116 in a case in which a horizontal electric field between the pixel electrode 114 and the common electrode 116 is not affected, so that the liquid crystal modules LC close to the second substrate 102 present an approximately-vertical arrangement, thereby achieving a function of a narrow viewing angle, as shown in FIG. 5. For example, when the pixel 110 corresponding to the first viewing angle control electrode series 124 has a positive polarity, a maximum pixel voltage may be 5 V, and therefore the first viewing angle control voltage V1 is 5 V; in this case, the pixel 110 corresponding to the second viewing angle control electrode series 126 has a negative polarity, and a maximum pixel voltage thereof may be −5 V, and therefore the second viewing angle control voltage V2 is −5 V. It should be noted that by means of a design that the first electrode parts and the second electrode parts are alternately arranged along the second direction in cooperation with separate provision of the first viewing angle control voltage V1 and the second viewing angle control voltage V2 having opposite polarities to the first viewing angle control electrode series 124 and the second viewing angle control electrode series 126, pixel voltages having opposite polarities may be respectively provided to the pixels 110 that are located on a same line and adjacent to each other, so that the pixels 110 can perform a driving manner of column inversion (column inversion) when having a narrow viewing angle.

Figure 6:
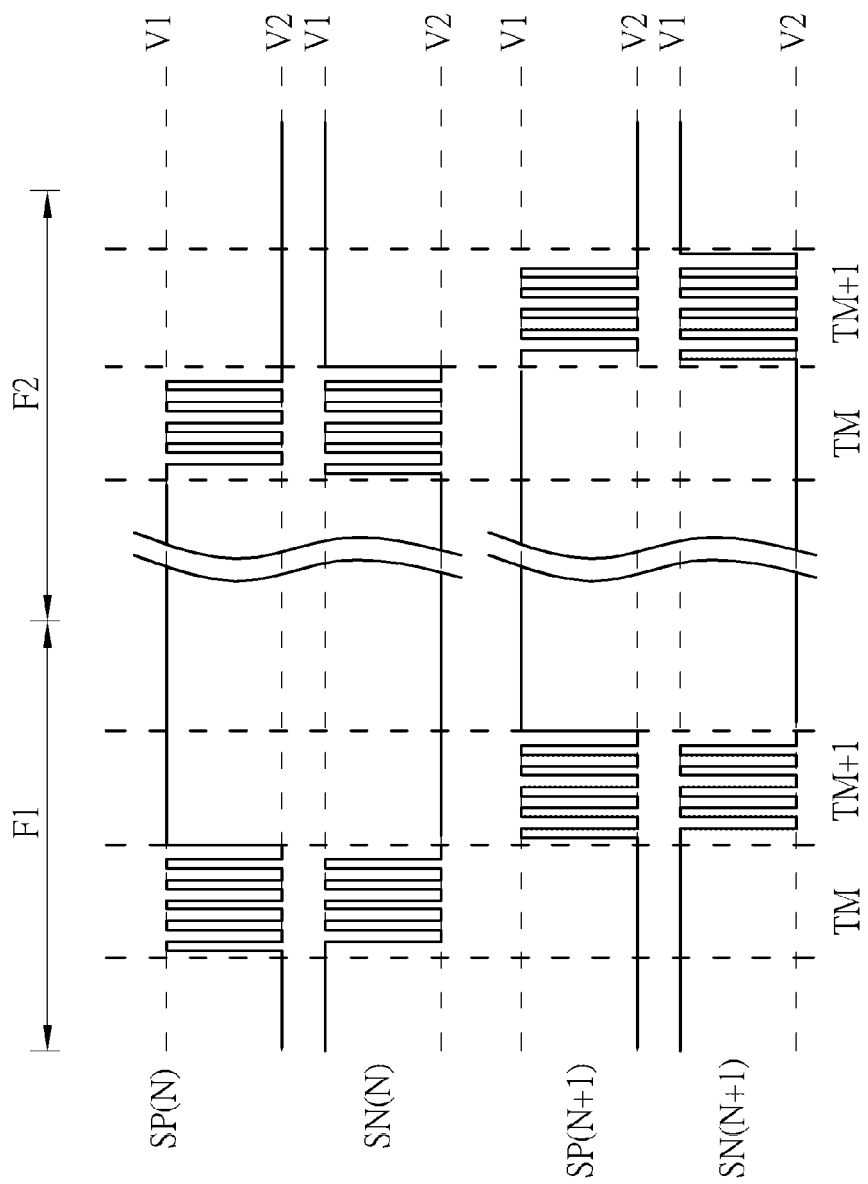
FIG. 6 is a sequence diagram of a first image and a second image of a gate signal, a touch signal, and first and second viewing angle control voltages of the touch display panel of the first embodiment of the present invention in the first display mode.

Referring to FIG. 6, FIG. 6 is a sequence diagram of a first image and a second image of a gate signal, a touch signal, and first and second viewing angle control voltages of the touch display panel of the first embodiment of the present invention in the first display mode. As shown in FIG. 6, in this embodiment, the method for driving the touch display panel 100 in the first display mode may further include the following steps. In an Mth timing of a second image F2 that closely follows the first image F1, providing the first viewing angle control voltage V1 in the first viewing angle control electrode series 124 is stopped, and providing the second viewing angle control voltage V2 in the second viewing angle control electrode series 126 is stopped, and the touch signal TX is provided to the first viewing angle control electrode series 124 and the second viewing angle control electrode series 126 in the Nth viewing angle control electrode unit 118; in an (M+1)th timing of the second image F2, providing the touch signal TX is stopped, and the second viewing angle control voltage V2 is provided to the first viewing angle control electrode series 124 of the Nth viewing angle control electrode unit 118, and the first viewing angle control voltage V1 is provided to the second viewing angle control electrode series 126 in the Nth viewing angle control electrode unit 118, where M is equal to N and is a positive integer. In other words, signals SP(N) received by the first viewing angle control electrode series 124 of the Nth viewing angle control electrode unit 118 are the touch signal TX, the first viewing angle control voltage V1, the touch signal TX, and the second viewing angle control voltage V2 in sequence, and signals SN(N) received by the second viewing angle control electrode series 126 are the touch signal TX, the second viewing angle control voltage V2, the touch signal TX, and the first viewing angle control voltage V1. In this way, a same first viewing angle control electrode series 124 and a same viewing angle control electrode series 126 may provide viewing angle control voltages with suitable polarities for corresponding pixel lines, so that the pixels 110 can perform a driving manner of frame inversion (frame inversion).

Figure 7:
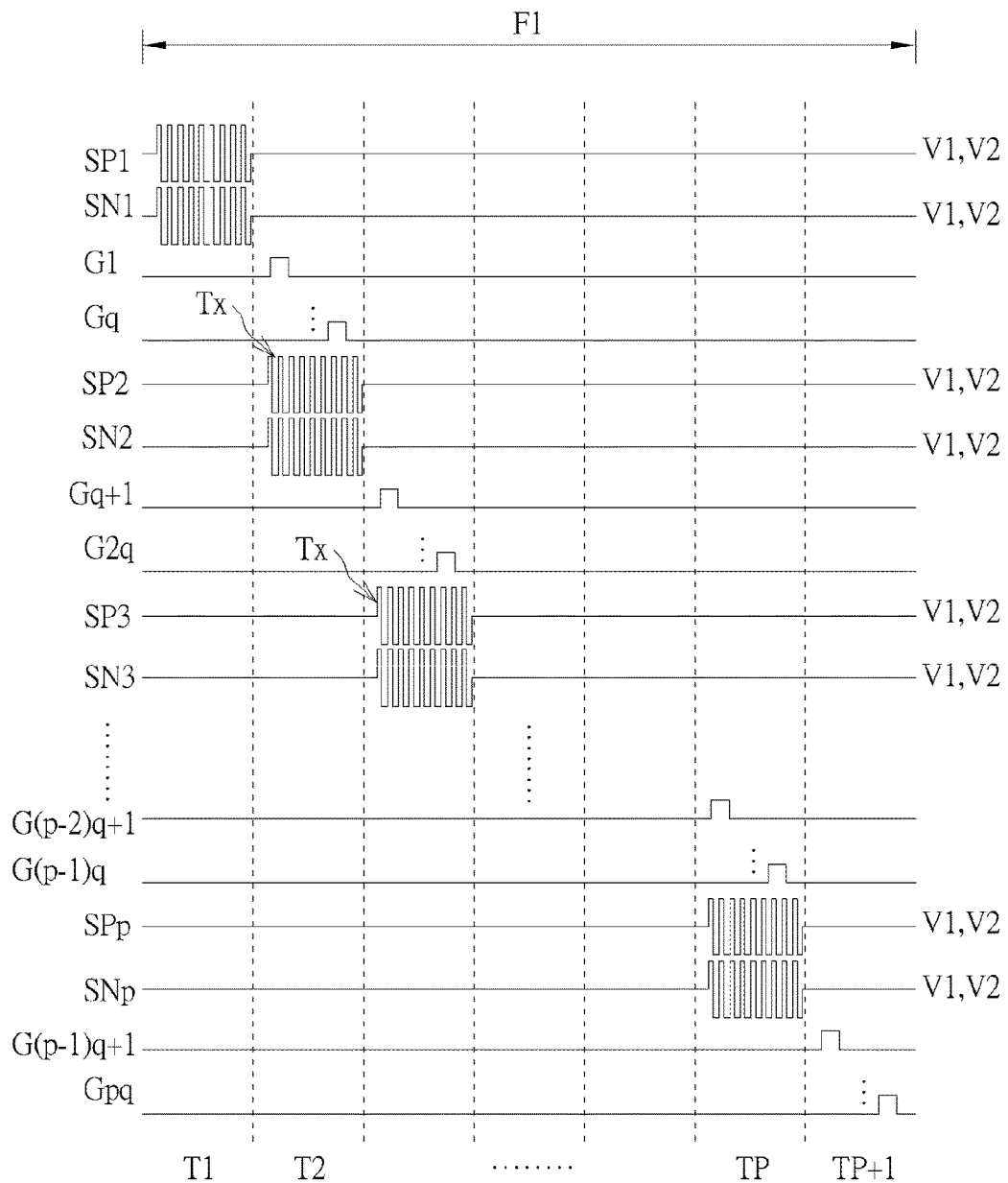
FIG. 7 is a schematic diagram of a method for driving the touch display panel of the first embodiment of the present invention in a second display mode.
Figure 8:
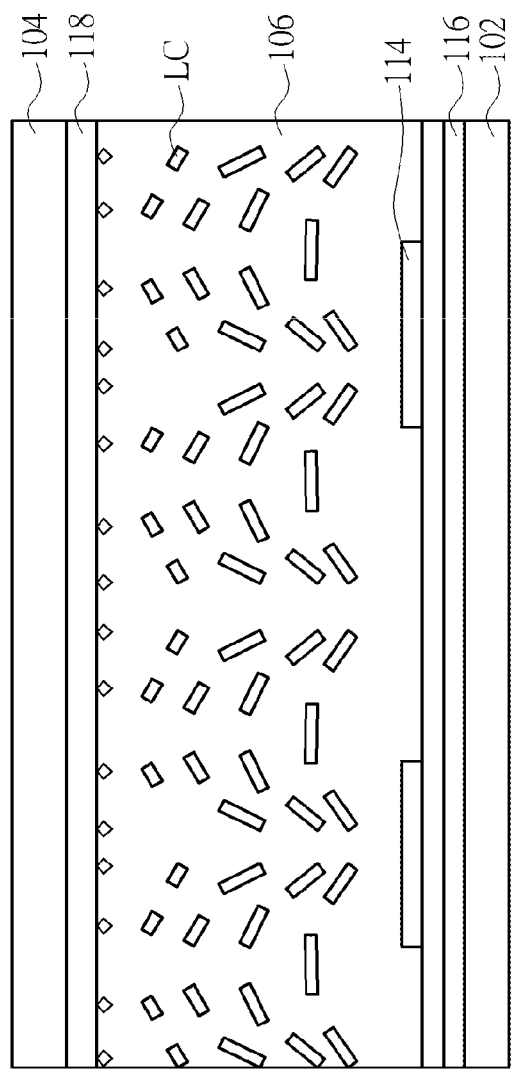
FIG. 8 is a schematic sectional view of the liquid crystal modules of the touch display panel of the first embodiment of the present invention in the second display mode.

Referring to FIG. 7 and FIG. 8, FIG. 7 is a schematic diagram of a method for driving the touch display panel of the first embodiment of the present invention in a second display mode, and FIG. 8 is a schematic sectional view of the liquid crystal modules of the touch display panel of the first embodiment of the present invention in the second display mode. Compared with the first display mode, in the method for driving the touch display panel 100 in this embodiment in the second display mode, the first viewing angle control voltage V1 provided to the first viewing angle control electrode series 124 and the second viewing angle control voltage V2 provided to the second viewing angle control electrode series 126 are the same as a voltage provided to the common electrode 116 of the pixels 110. In this way, the first viewing angle control electrode series 124 and the second viewing angle control electrode series 126 do not form a vertical electric field with the common electrode 116, so that the liquid crystal modules LC close to the second substrate 102 present an approximately-horizontal arrangement, and therefore a horizontal electric field formed between the pixel electrode 114 and the common electrode 116 can drive the liquid crystal modules LC to achieve a function of a wide viewing angle, as shown in FIG. 8.

Based on the above, the first viewing angle control electrode series 124 and the second viewing angle control electrode series 126 of the viewing angle control electrode units 118 of this embodiment may be used as driving electrodes of the touch unit TU, and may also be used as electrodes that control a viewing angle, thereby reducing additionally set driving electrodes of the touch unit TU. In addition, because the viewing angle control electrode units 118 may be used as driving electrodes of the touch unit TU, a quantity of the viewing angle control electrode units 118 may be increased significantly, so that time when viewing angle control voltages are applied may cover most of display time of the corresponding pixels 110, so as to reduce a time difference therebetween, thereby improving a peep-proof function of images displayed by the pixels 110. Further, the touch signal TX may be respectively integrated with the first viewing angle control voltage V1 and the second viewing angle control voltage V2, so that an integrated signal may be provided only by means of a single driving circuit that originally provides the touch signal, and therefore elements that drive the viewing angle control electrode unit 118 can be reduced, and a load of the touch display panel 100 can be reduced. It should be noted that because a frequency of the touch signal TX generally is 100 Hz, a frequency of gate signals of this embodiment needs to be improved to 120 Hz, so that the touch signal TX and the gate signals can be transmitted synchronously.

The touch display panel of the present invention and the driving method therefore are not limited to the foregoing embodiment. The following continues to disclose other embodiments of the present invention. However, in order to simplify description and highlight differences between various embodiments, same elements are marked with same reference signs, and repetitive parts are not described again.

Figure 9:
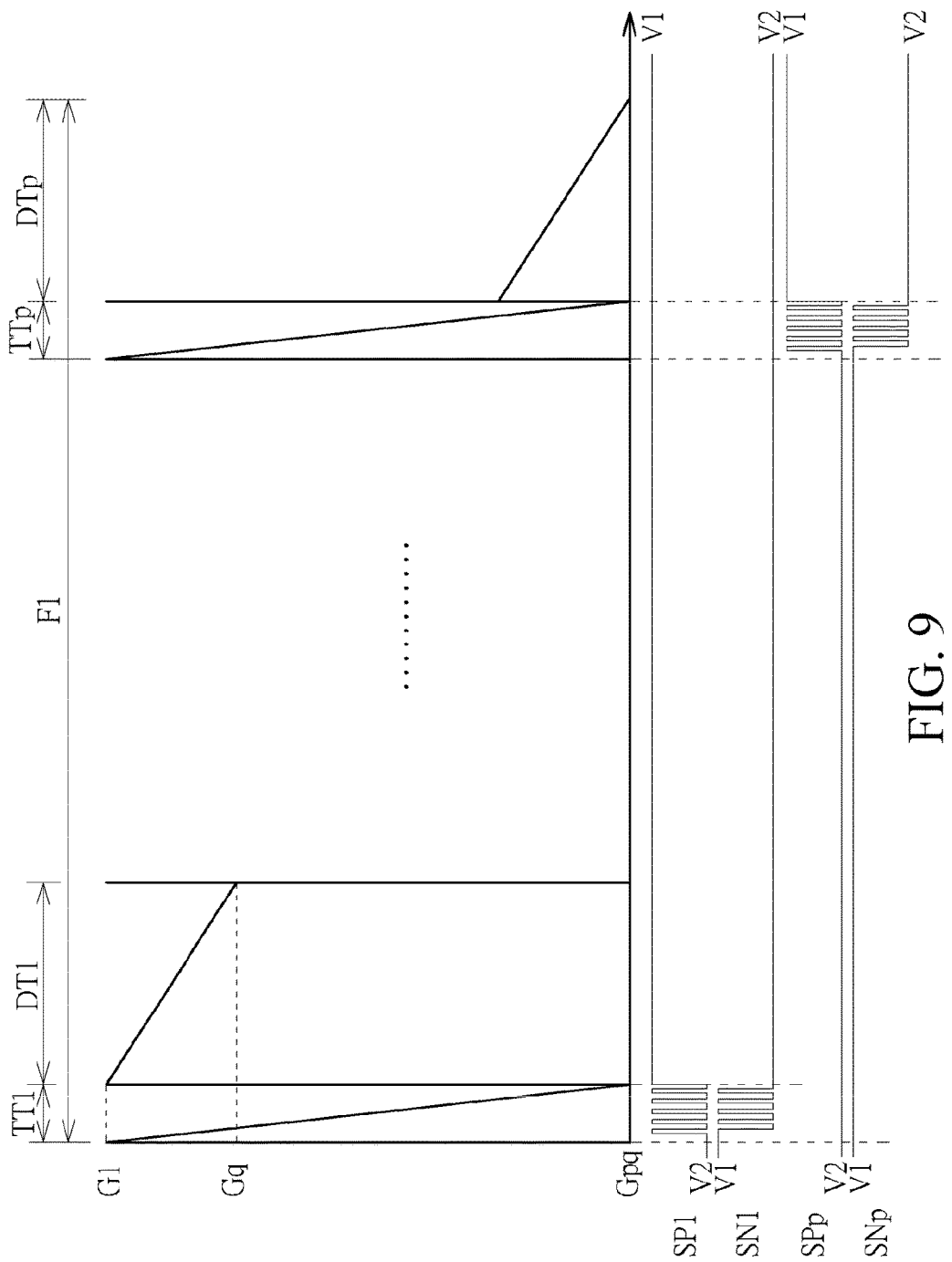
FIG. 9 is a schematic diagram of a method for driving a touch display panel of a second embodiment of the present invention in a first display mode.

Referring to FIG. 9, FIG. 9 is a schematic diagram of a method for driving a touch display panel of a second embodiment of the present invention in a first display mode. As shown in FIG. 9, compared with the first embodiment, a touch signal TX and a gate signal of a touch display panel of this embodiment are not transmitted synchronously. Specifically, a first image F1 may be divided into a plurality of touch periods and a plurality of display periods, and each of the touch periods and each of the display periods are alternately presented. First, in a first touch period TT1, a second driving unit 146 transmits the touch signal TX to the first viewing angle control electrode unit 118, and the gate signal is not transmitted in this case. Then, in a first display period DT1, gate signals G1 to Gq are transmitted in sequence to the pixels 110 of the corresponding first viewing angle control electrode unit 118, and a first viewing angle control voltage V1 and a second viewing angle control voltage V2 are respectively provided to the first viewing angle control electrode series 124 and the second viewing angle control electrode series 126 of the first viewing angle control electrode unit 118. By such analogy, in a pth touch period TTp, the touch signal TX is transmitted to a pth viewing angle control electrode unit 118. In a pth display period DTp, gate signals G(p−1)q+1 to Gpq are transmitted in sequence to the pixels 110 of the corresponding pth viewing angle control electrode unit 118, and the first viewing angle control voltage V1 and the second viewing angle control voltage V2 are respectively provided to the first viewing angle control electrode series 124 and the second viewing angle control electrode series 126 of the pth viewing angle control electrode unit 118. It should be noted that because the touch signal TX and the gate signal of this embodiment are driven at different time, a frequency of the gate signal may be reduced to 60 Hz, so as to reduce a load of the display control element 142.

Figure 10:
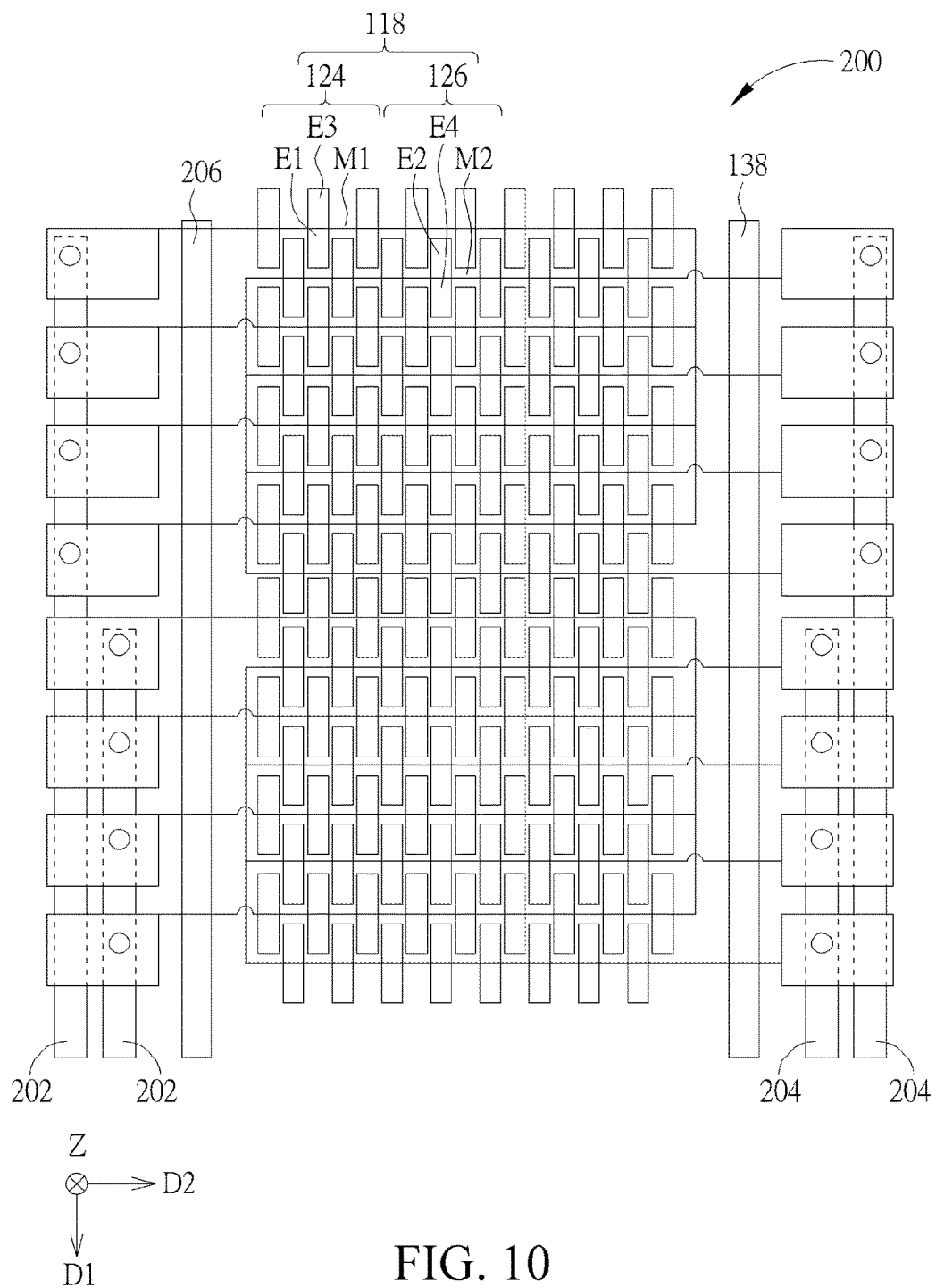
FIG. 10 is a schematic top view of a touch display panel of a third embodiment of the present invention.

Refer to FIG. 10, and refer to FIG. 2 at the same time. FIG. 10 is a schematic top view of a touch display panel of a third embodiment of the present invention. As shown in FIG. 2 and FIG. 10, compared with the first embodiment, a first connection line 202 and a second connection line 204 of a touch display panel 200 of this embodiment are respectively located on two sides of pixels 110. In other words, a viewing angle control electrode unit 118 of this embodiment is provided between the first connection line 202 and the second connection line 204 in a direction Z vertically projected on a first substrate 102. In addition, in order to prevent the first connection line 202 and the second connection line 204 from affecting wiring configuration in an array circuit layer, the touch display panel 200 may further include a second gate driving circuit 206, electrically connected to the pixels 110, and the second gate driving circuit 206 is provided between the viewing angle control electrode unit 118 and the first connection line 202, and a first gate driving circuit 138 is provided between the viewing angle control electrode unit 118 and the second connection line 204.

Figure 11:
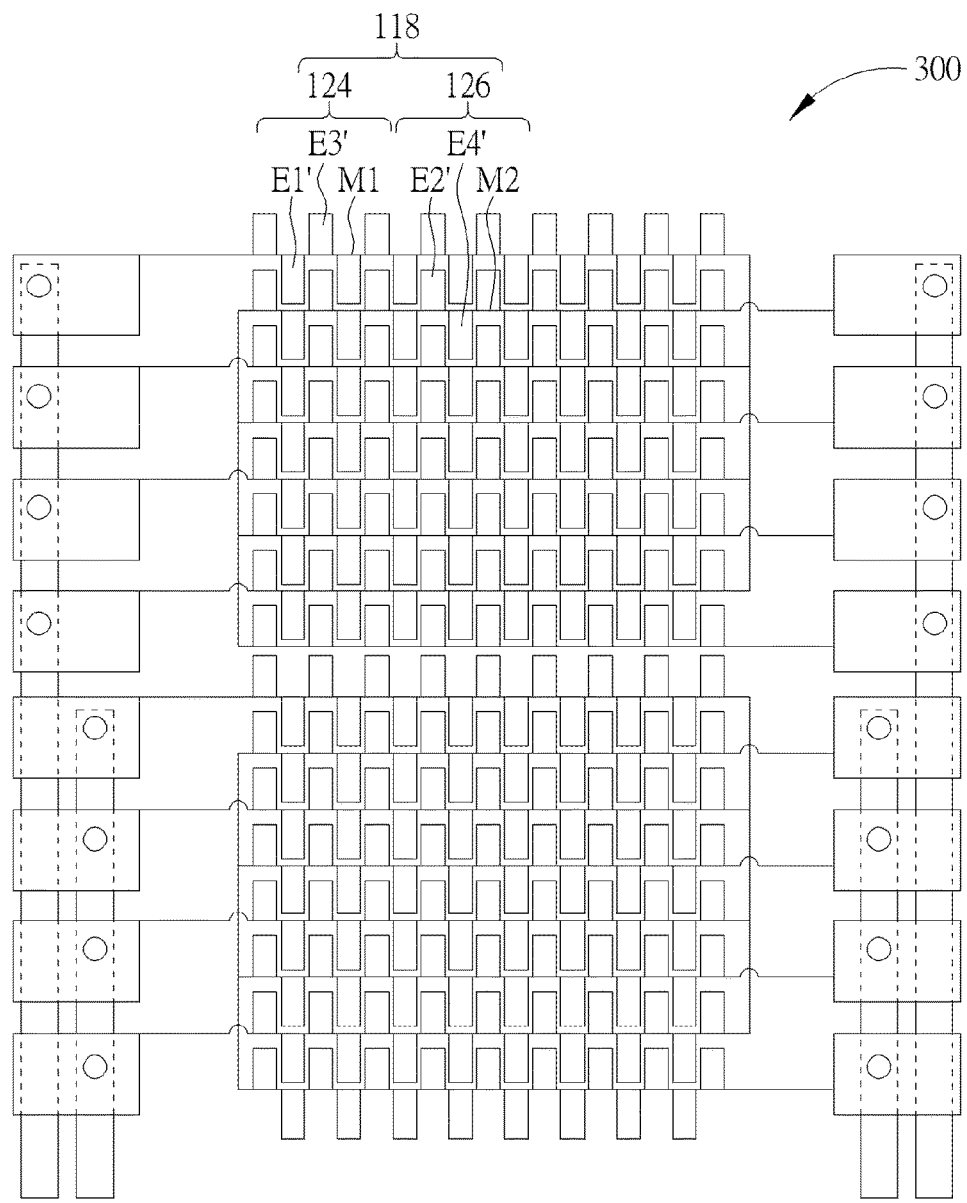
FIG. 11 is a schematic top view of a touch display panel of a fourth embodiment of the present invention.

Referring to FIG. 11, FIG. 11 is a schematic top view of a touch display panel of a fourth embodiment of the present invention. As shown in FIG. 11, compared with the third embodiment, each of third electrode parts E3' of a touch display panel 300 of this embodiment and a second electrode part E2' corresponding thereto are arranged in a first direction D1, and each of fourth electrode parts E4' and a first electrode part E1' corresponding thereto are arranged in the first direction D1. That is, each of the third electrode parts E3' and each of the first electrode parts E1' are alternately arranged along a second direction D2, and each of the fourth electrode parts E4' and each of the second electrode parts E2' are also alternately arranged along the second direction D2. By means of the design, a first viewing angle control electrode series 124 and a second viewing angle control electrode series 126 that correspond to pixels 110 in a same column may respectively provide viewing angle control voltages with alternately arranged polarities, so that the pixels 110 can perform a driving manner of dot inversion (dot inversion).

Based on the above, in the touch display panel of the present invention, the first viewing angle control electrode series and the second viewing angle control electrode series of the viewing angle control electrode unit not only may be used as driving electrodes of the touch unit, and but also may be used as electrodes that control a viewing angle, thereby reducing additionally set driving electrodes of the touch unit. In addition, because the viewing angle control electrode units may be used as driving electrodes of the touch unit, a quantity of the viewing angle control electrode units may be increased significantly, so that time when viewing angle control voltages are applied may cover most of display time of the corresponding pixels, so as to reduce a time difference therebetween, thereby improving a peep-proof function of images displayed by the pixels.

The foregoing are merely preferred embodiments of the present invention, and any equivalent variations and modifications made according to the claims of the present invention shall fall within the scope of the present invention.

What is claimed is:

1. A touch display panel, comprising:
    a first substrate;
    a second substrate;
    a third substrate, wherein the second substrate is positioned between the first substrate and the third substrate;
    a medium display layer positioned between the first substrate and the second substrate;
    a plurality of pixels positioned between the first substrate and the medium display layer, wherein each of the pixels comprises a pixel electrode and a common electrode, and at least one of the pixel electrode and the common electrode has a plurality of slits;
    a plurality of viewing angle control electrode units positioned between the second substrate and the medium display layer, and arranged in sequence along a first direction in a X axis;
    a plurality of touch receiving electrode units positioned between the second substrate and the third substrate, and arranged along in sequence a second direction in a Y axis, wherein the plurality of touch receiving electrode units are partially overlapping with the viewing angle control electrode units in a vertical direction in a Z axis projected on the first substrate, and the viewing angle control electrode units and the touch receiving electrode units form a touch unit; and
    a plurality of first connection lines and a plurality of second connection lines, wherein the first connection lines and the second connection lines are provided between the first substrate and the medium display layer, each of the first connection lines is respectively electrically connected to the first viewing angle control electrode series corresponding thereto, and each of the second connection lines is respectively electrically connected to the second viewing angle control electrode series corresponding thereto.

2. The touch display panel according to claim 1, wherein each of the viewing angle control electrode units comprises a plurality of first viewing angle control electrode series and a plurality of second viewing angle control electrodes series; and
    each of the first viewing angle control electrode series and each of the second viewing angle control electrode series are alternately arranged along the first direction.

3. The touch display panel according to claim 2, wherein each of the first viewing angle control electrode series comprises a plurality of first electrode parts, each of the second viewing angle control electrode series comprises a plurality of second electrode parts, and each of the first electrode parts and each of the second electrode parts are alternately arranged along the second direction.

4. The touch display panel according to claim 2, wherein the first viewing angle control electrode series are electrically connected to each other, and the second viewing angle control electrode series are electrically connected to each other.

5. The touch display panel according to claim 1, wherein each of the touch receiving electrode units comprises a first touch electrode series and a second touch electrode series, and the first touch electrode series and the second touch electrode series are provided in parallel along the second direction and are electrically connected to each other.

6. The touch display panel according to claim 1, wherein the viewing angle control electrode units are provided between the first connection lines and the second connection lines in the direction vertically projected on the first substrate.

7. The touch display panel according to claim 1, further comprising a driving circuit, which comprises a first sub driving circuit and a second sub driving circuit, wherein the first connection lines and the second connection lines are respectively electrically connected to the first driving unit and the second driving unit.

8. The touch display panel according to claim 7, wherein the first sub driving circuit provides a viewing angle control voltage signal, and the second sub driving circuit provides a touch signal.

9. A method for driving a touch display panel, comprising:
providing the touch display panel, wherein the touch display panel comprises:
- a plurality of pixels, wherein each of the pixels comprises a pixel electrode and a common electrode, and at least one of the pixel electrode and the common electrode has a plurality of slits;
- a plurality of viewing angle control electrode units, arranged in sequence along a first direction in a X axis, wherein each of the viewing angle control electrode units comprises a plurality of first viewing angle control electrode series and a plurality of second viewing angle control electrodes series, and each of the first viewing angle control electrode series and each of the second viewing angle control electrode series are alternately arranged along the first direction; and
- a plurality of touch receiving electrode units, arranged in sequence along a second direction in a Y axis, and partially overlapping with the viewing angle control electrode units in a vertical projected direction in a Z axis, wherein the viewing angle control electrode units and the touch receiving electrode units form a touch unit; and providing a touch signal to the first viewing angle control electrode series and the second viewing angle control electrode series of a Nth viewing angle control electrode unit in an Nth timing of a first image, wherein N is a positive integer;

terminating the touch signal to the Nth viewing angle control electrode unit in an (N+1)th timing of the first image;

providing a first viewing angle control voltage to the first viewing angle control electrode series and a second viewing angle control voltage to the second viewing angle control electrode series of the Nth viewing angle control electrode unit in the (N+1)th timing of the first image;

providing the touch signal to the first viewing angle control electrode series and the second viewing angle control electrode series of the Nth viewing angle control electrode unit in an Mth timing of a second image;

terminating the touch signal to the first viewing angle control electrode series of the Nth viewing angle control electrode unit in an (M+1)th timing of the second image; and providing the second viewing angle control voltage to the first viewing angle control electrode series of the Nth viewing angle control electrode unit, and providing the first viewing angle control voltage to the second viewing angle control electrode series of the Nth viewing angle control electrode unit in the (M+1)th timing of the second image, wherein M is equal to N and is a positive integer.

10. The method according to claim 9, further comprising: in the (N+1)th timing, providing a plurality of gate signals in sequence respectively to the pixels corresponding to the Nth viewing angle control electrode unit.

11. The method according to claim 9, wherein in a first display mode, the first viewing angle control voltage is equal to a pixel voltage provided to the pixel electrode when each of the pixels has a positive polarity and displays a maximum gray-scale value, and the second viewing angle control voltage is equal to a pixel voltage provided to the pixel electrode when each of the pixels has a negative polarity and displays a maximum gray-scale value.

12. The method according to claim 9, wherein in a second display mode, the first viewing angle control voltage and the second viewing angle control voltage are equal to a voltage provided to the common electrode of each of the pixels.

* * * * *